United States Patent
Yu et al.

(10) Patent No.: US 6,214,415 B1
(45) Date of Patent: Apr. 10, 2001

(54) METHOD FOR INCREASING PAINT RECYCLING RATE IN A PAINT COATING PROCESS

(75) Inventors: Janson Yu; C. M. Liao, both of Kwei-Shan (TW)

(73) Assignee: Enlight Corporation, Taoyuan (TW)

(*) Notice: Subject to any disclaimer, the term of this patent is extended or adjusted under 35 U.S.C. 154(b) by 0 days.

(21) Appl. No.: 09/348,131

(22) Filed: Jul. 2, 1999

(51) Int. Cl.$^7$ .................................. B05D 1/32; B05D 3/02
(52) U.S. Cl. .................... 427/345; 427/424; 427/189; 427/372.2; 118/70; 118/500
(58) Field of Search .................... 427/345, 375, 427/424, 189, 372.2; 118/70, 500, 501, 324

(56) References Cited

U.S. PATENT DOCUMENTS

| | | | |
|---|---|---|---|
| 4,319,543 | * 3/1982 | Shank | 118/324 |
| 4,901,666 | * 2/1990 | Nagasaka et al. | 118/70 |
| 5,292,547 | * 3/1994 | Schlumpf et al. | 427/345 |

* cited by examiner

Primary Examiner—Shrive Beck
Assistant Examiner—Kirsten A. Crockford
(74) Attorney, Agent, or Firm—Senniger, Powers, Leavitt & Roedel

(57) ABSTRACT

A method applied in a coating process is to increase the recycling rate for coating materials. For this method, a jig with a special design is employed. The jig is a base-and-cover combination type and is separable. Using such a jig would enable powdered material sprayed on an object to mostly adhere thereon. There will be a small amount of coating material adhering on the jig in this improved process, however, most of which, in fact, would adhere to the cover of the jig. At the end of the process, the cover of the jig is separated from the base of the jig, and is transported to a coating material recycling process, in which the material adhering to the cover of the jig is recycled, and the base of the jig as well as the object is conveyed to proceed with a baking process.

3 Claims, 7 Drawing Sheets

METHOD FOR INCREASING PAINT RECYCLING RATE IN A PAINT COATING PROCESS

FIELD OF THE INVENTION

The present invention relates to a method for increasing the recycling rate of coating material in a powder coating process and a jig employed in the method.

BACKGROUND OF THE INVENTION

The classification for a variety of the methods for coating painting depends on whether or not a solvent is used, and can be generally divided into powder coating and liquid coating. In short, if a solvent is used, the coating process can be classified as a liquid coating; if solvent is unnecessary, it can be classified as powder coating.

Since solvents used in the process of coating can cause air and water pollution to the environment, the cost involved for environmental protection is increasing as the standards required for environmental protection are getting stricter. In addition, in considering the quality of the coating, powder coating has some advantages over liquid coating described as follows: pin holes are rarely found in powder coating; a thicker coating can be attained in one process, unlike a liquid coating, in which running of the paint usually occurs if the coat applied is too thick. Moreover, in the process of liquid coating, a primer coat and at least one finish coat is necessary, in contrast, powder coating can be completed by an application of a single coat, in other words, the process of powder coating is comparably simple. In addition, the process can proceed faster, and accordingly, the cost is lowered.

For the forgoing reasons, the application of powder coatings has been becoming more widely utilized, so the importance of improving the process of powder coating increases. Among the improved measures, some relate to the quality, some, on the other hand, relate to bringing down the cost. Regarding the cost, the recycling rate of a coating material is considered an important factor. Among the coating processes applied, aside from collecting the un-adhered coating material, there is no solution yet to solve the problem of the waste of coating material in the coating process.

The layout of an conventional powder coating process is shown in FIG. 1. On the left hand side of the figure, an operator attaches an object C to be coated to the jig 1. The object C and the jig 1 carried by the conveyer 2 would follow the direction indicated by the arrow and enter the coating chamber 200'. There is a coating material recycler 100' in the coating chamber 200', which can recycle the powered coating material which does not adhere to the object C in the coating process After the coating process is finished, the object C and the jig 1 enter the baking chamber 300' where the baking process proceeds. After the baking process is completed, the aerator (shown in the right hand side of FIG. 1) pulls off the object C from jig 1 leaving jig 1 on the conveyer 2, the entire cycle of coating process is thus complete, and then another cycle will begin following the same procedures as described above.

In the coating process, objects C are hung up and are carried along a specific route. The jigs used in the coating process would also be covered with significant amount of coating material. As the number of jigs used in a production line is enormous, the amount of coating material accumulated on the jigs would be to great to be ignored. However, since the same jig is used in coating and baking process, the coating material covered on the jig cannot be recycled after being baked. Moreover, if the jig is continually used, the coating material accumulated on the jig would grow thicker until the layer is too thick to be mounted with the object to be coated. Generally, a jig cannot be used over twenty times and then has to be discarded, and that increases the cost of the process. The object of the present invention is to improve the rate of the recycled coating material and to increase the life span of the jig.

SUMMARY OF THE INVENTION

The present invention relates to a method for recycling coating material in a powder coating process in order to increase the recycled rate for a conventional powder coating process, and relates to a jig employed in the same method.

The jig as used in the present invention is a separable assembly consisted of a base and a cover. While the coating is in processing, the object to be coated is attached to the assembled jig. The characteristics of the jig is that when the object is attached to the jig, it forms with the jig an almost sealed chamber, therefore, all the coating material would substantially adhere on the object and the cover of assembled jig, namely, the coating material would not adhere to the base of the jig. After the process is completed, the cover of the jig (hereinafter referred to as jig cover) is separated from the base of the jig (hereinafter referred to as jig base), and the jig cover will next enter the (coating material) recycling chamber in which the coating material adhering on the jig cover will be recycled. Using this jig, the coating material not adhering on the object will almost be completely recycled. In the coating process, the object is hung on the jig base and is carried with the jig base by a conveyor and transported to the baking chamber. After finishing baking, the object is taken off of the jig base by the operator, and the base is carried to the next stop for processing where an another operator will put a jig cover which has been recycled onto the jig base. The assembled jig is transported to the next stop where an operator will put a object to be coated onto the jig, and the procedures are repeated for the next cycle.

BRIEF DESCRIPTION OF THE DRAWINGS

The foregoing and other objects, features and advantages of the invention will be apparent from the following description of preferred embodiment of the invention and the accompanying drawings in which like reference characters refer to the same parts through the different views.

FIG. 4b is the sectional view of the jig base along line 4b—4b in FIG. 4a;

FIG. 5b is a sectional view of the assembled jig cover and jig base along line 5b—5b in FIG. 5a;

FIG. 6b is a sectional view of the jig with the object along line 6b—6b in FIG. 6a;

FIG. 7b is a sectional view of the jig with object being pulled out along line 7b—7b in FIG. 7a.

DETAILED DESCRIPTION OF THE PREFERRED EMBODIMENT

The preferred embodiment in accordance with the present will be illustrated by the following descriptions with the accompanying figures.

Figure 1:
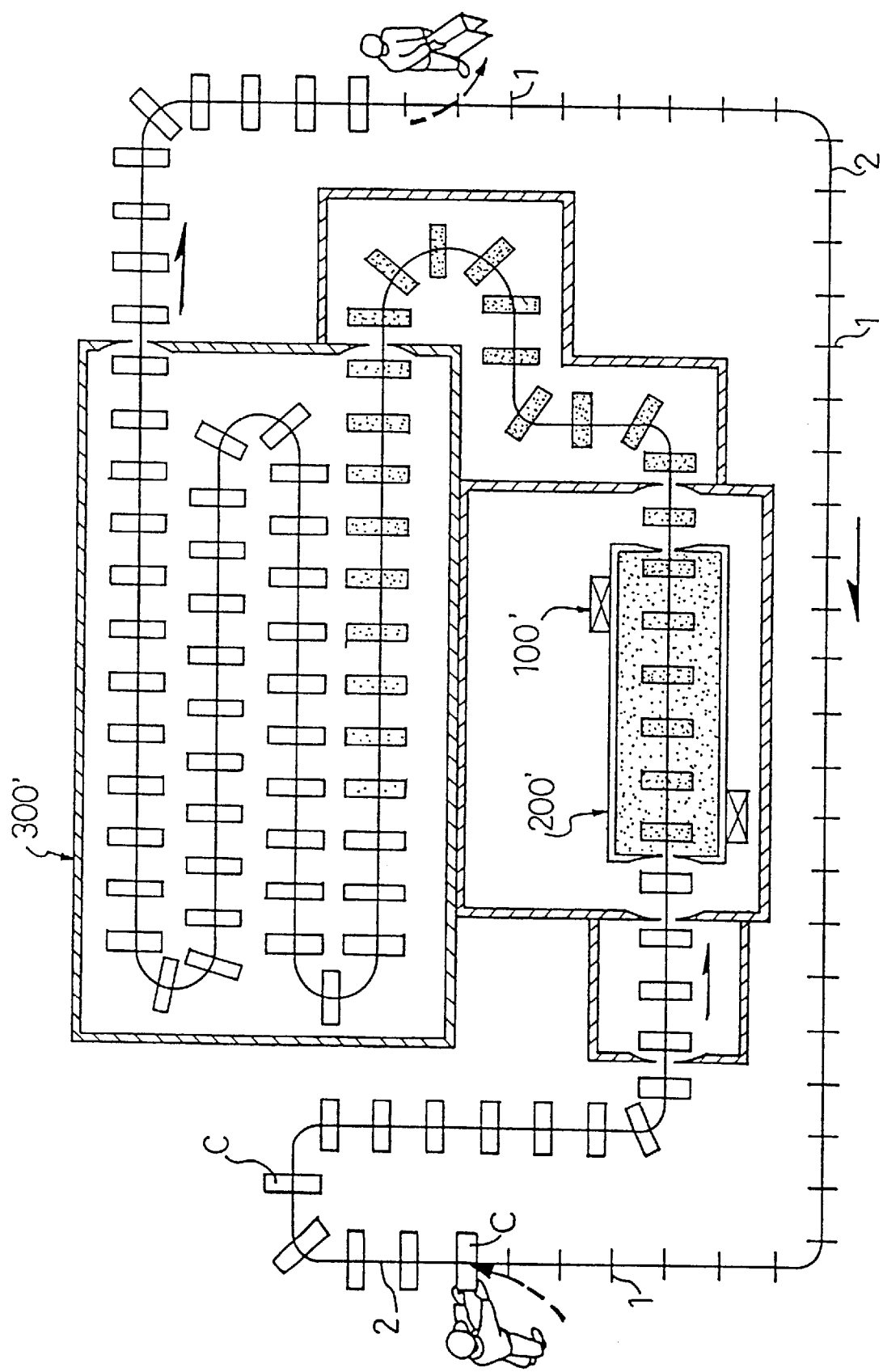
FIG. 1 is a layout for a conventional powder coating process.
Figure 2:
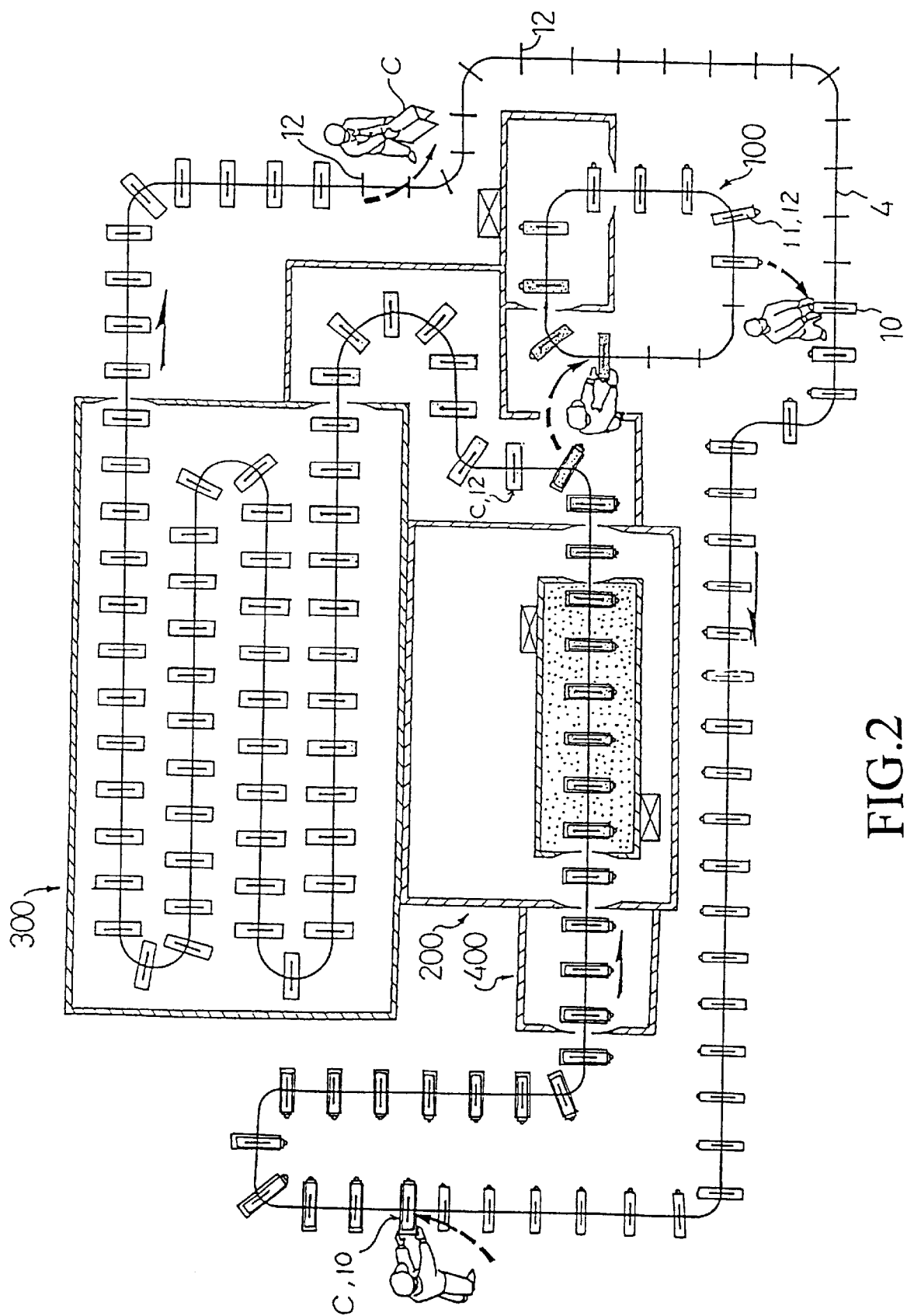
FIG. 2 is a layout for the powder coating process in accordance with the present invention.

As illustrated in FIG. 2, the method in accordance with the present invention has an additional coating material recycling process as compared with the conventional process shown in FIG. 1. For illustrative purposes, the place where the object C is unloaded is selected as the starting point for the entire process in accordance with the present invention.

The night hand side in FIG. 2 where an operator is shown is called "unloading area." After the operator unloads the object C from the jig base 12, a repeated cycle of the process for powder coating will begin. When the object C is unloaded, only the jig base 12 is left on the conveyor 4, and the jig base 12 is continually carried forwards. When being transported near to the recycling chamber 100, an operator is responsible to mount the jig base 12 with the jig cover 11. The combined jig cover 11 and jig base 12 are called jig and is denoted by 10. The jig 10 is continually transported to the place shown on the left hand side in FIG. 2 where an operator stands nearby. The place is called "object loading area," and the operator attaches an object C to the jig 10. The object C will be carried with the jig 10 into the coating chamber 200 for the performance of the coating process.

In order to obtain a higher quality of coating, the object C must be cleansed prior to the coating process so that in the subsequent coating process, the coating material will adhere to the surface more firmly. It is therefore desired that a cleansing room be provided before the coating chamber 200.

The efficiency of a conventional powder coating process is quite low, that is, there is high proportion of powdered coating material sprayed on the object C which cannot adhere thereto. To recycle the powdered coating material which cannot adhere to the object C, the coating chamber 200 is usually provided with a recycling device which can recycle the powder sprayed on the object C and the jig 10 that does not adhere thereon. After the coating process is completed, an operator will pull off the jig cover 11, and deliver it into the recycling chamber 100. The jig cover 11 is provided with a handle 21 (referring to FIG. 3), it enables the operator to easily pull off the jig cover 11. As a portion of the jig cover 11 is exposed to the air, some powdered coating material will adhere to the portion during the coating process. The powder adhered thereto will almost completely be recycled from the jig cover 11 through the spraying of a high-pressured air jet. The jig cover 11 can be repeatedly used in the subsequent cycles if it is cleansed.

When the jig cover 11 is pulled off from jig base 12 after the coating process, the object C and the jig base 12 are advanced into the baking chamber 300. The powdered coating material after baking will be cured and forms a hard coating. The baking process is completed when the jig base 12 and the object 12 are transported out of baking chamber 300. When they are transported to the object unloading area, the object C will be unloaded by an operator, and thus becomes a finished product.

Figure 3:
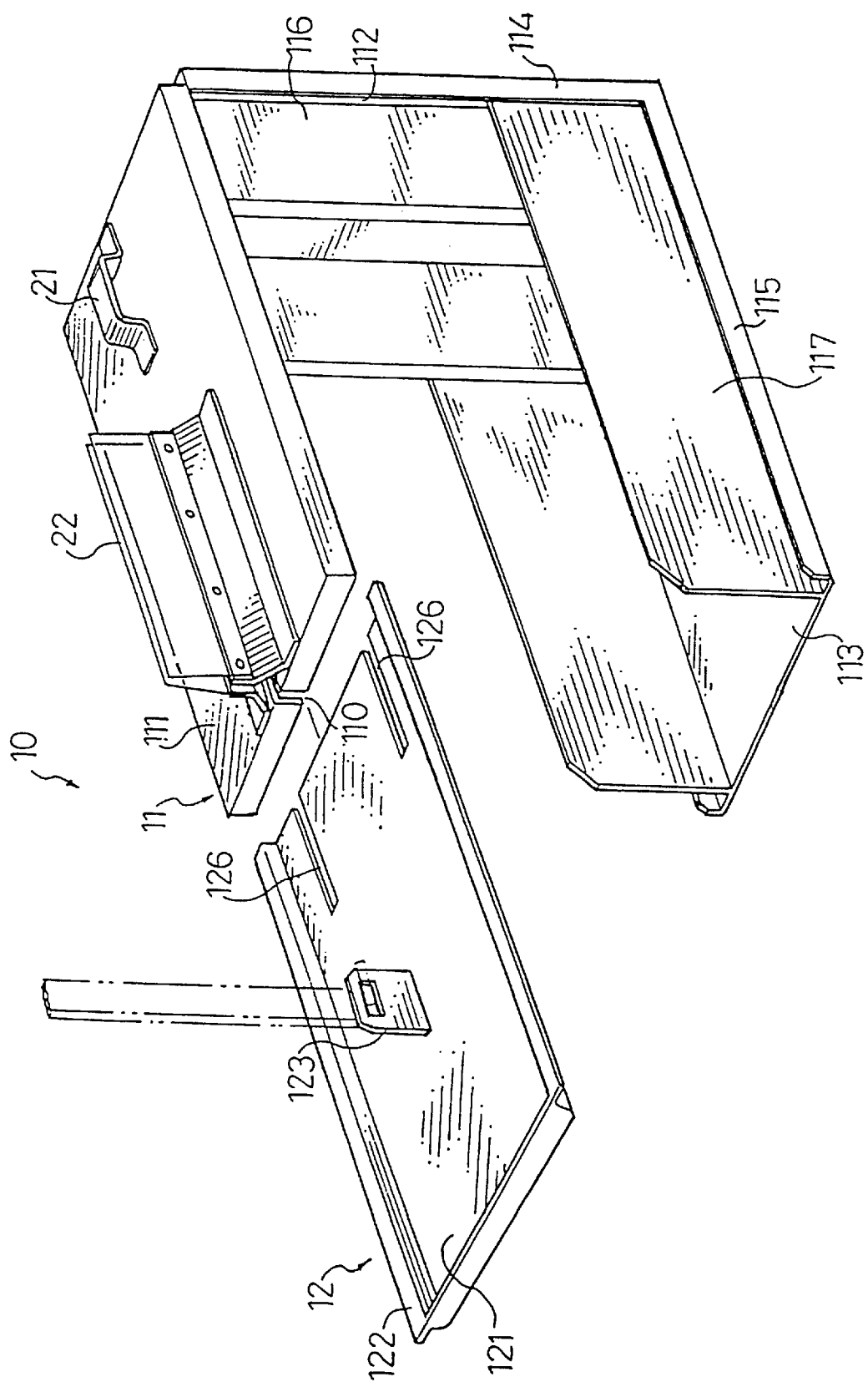
FIG. 3 is a jig used in the powder coating process in accordance with the present invention, which includes a jig cover and jig base.

The jig 10 used in the method in accordance with the subject invention is a kind of separable type as shown in FIG. 3. The jig 10 includes a jig cover 11 and jig base 12.

Figure 4A:
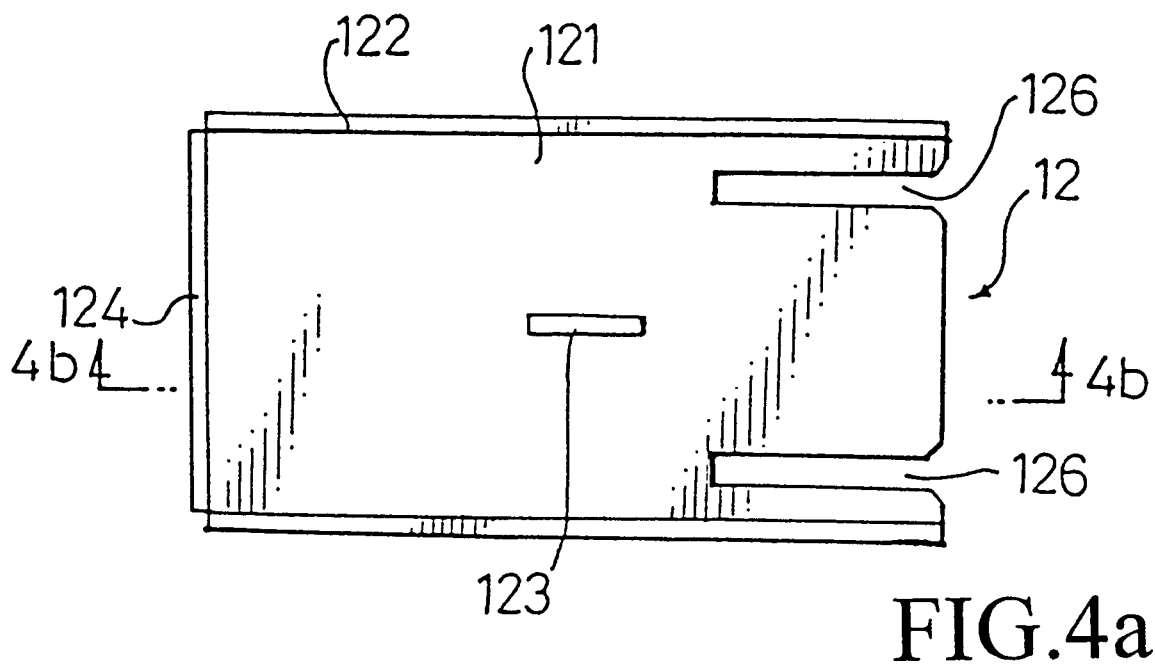
FIG. 4a is the top view of the jig base shown in FIG. 3.
Figure 4B:
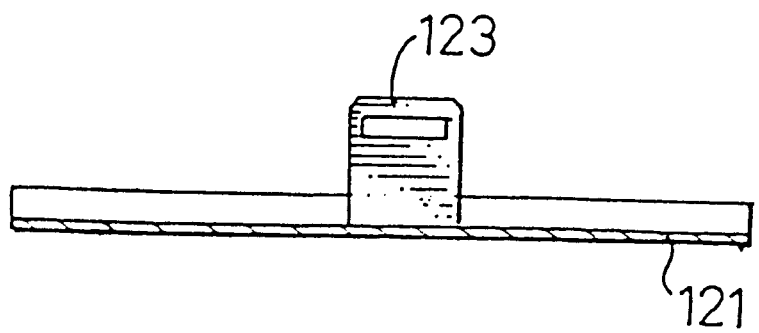

As shown in FIGS. 4a and 4b, the jig base 12 comprises a supporting plate 121 and a hanger 123, in which the supporting plate 121 is to support jig cover 11; the edges of the supporting plate 121 are folded to form folded edge 122 for supporting the object C (referring to FIGS. 6a and 6b); the end of supporting plate 121 forms an end plate 124 to prevent the object C from slipping off of the jig base 12; the hanger 123 is located in the center of the supporting plate 121 so that the jig base 12 can be hung on the conveyer 4.

Figure 5A:
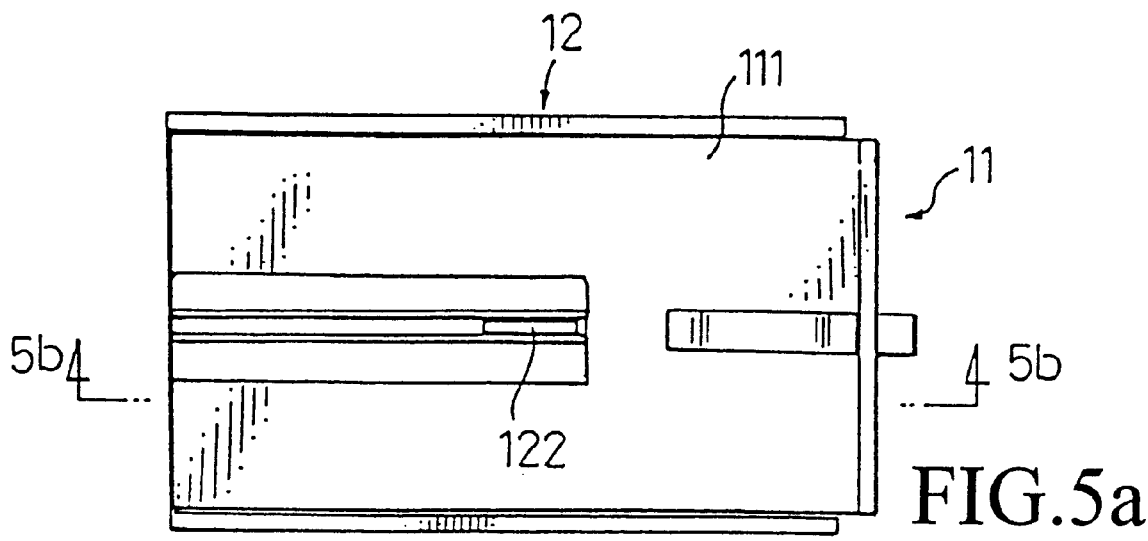
FIG. 5a is the top view of the assembled jig cover and jig base shown in FIG. 3.
Figure 5B:
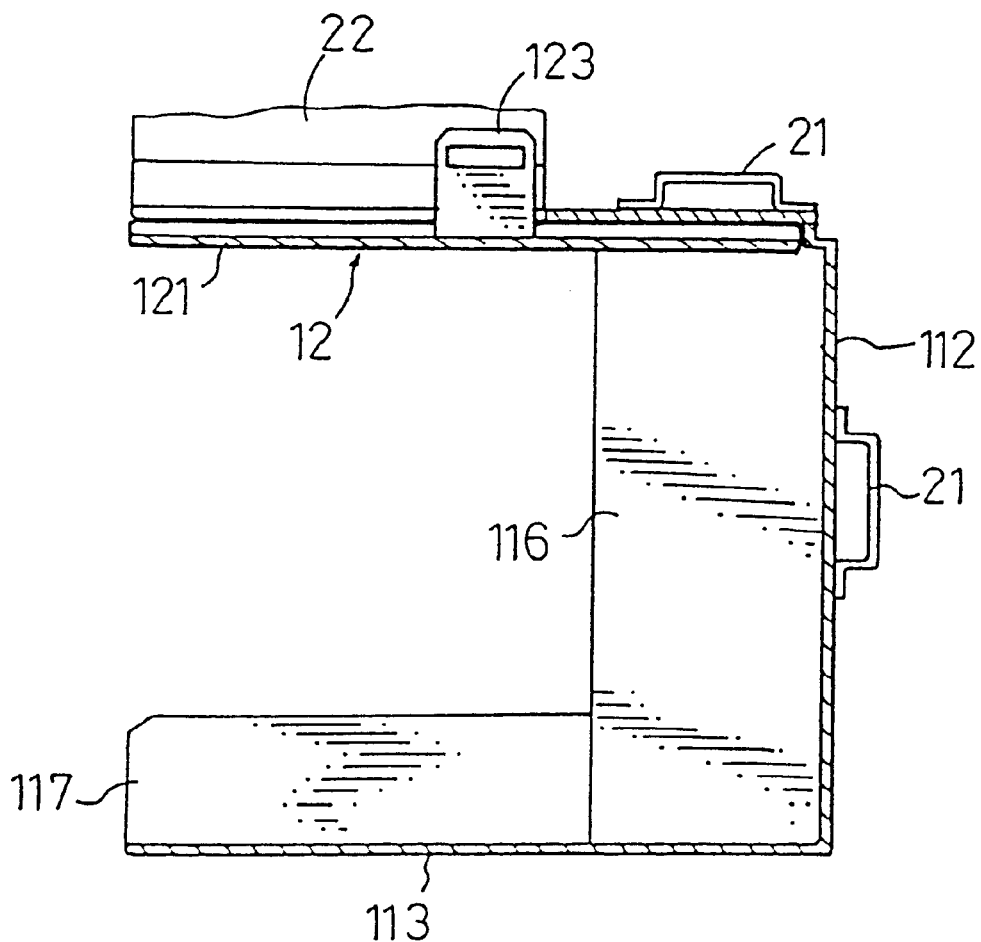

As shown in FIG. 3, the jig cover 11 primarily comprises a horizontal top plate 111, a vertical side plate 112 and a horizontal bottom plate 113. Additional reinforcing plates 116 are provided for reinforcing the strength of the structure of the jig cover 11; the guiding plates 117 are provided to allow the object C to be guided and to attach to the jig 10. Referring to FIGS. 5a and 5b, when the jig cover 11 is assembled with the jig base 12, the jig cover 11 urges on the supporting plate 121 and is supported by the supporting plate 121. The supporting plate 121 forms two slots 126 for preventing interference caused by the reinforcing plate 116 when the jig base 12 and the jig cover 11 are assembled.

Figure 6A:
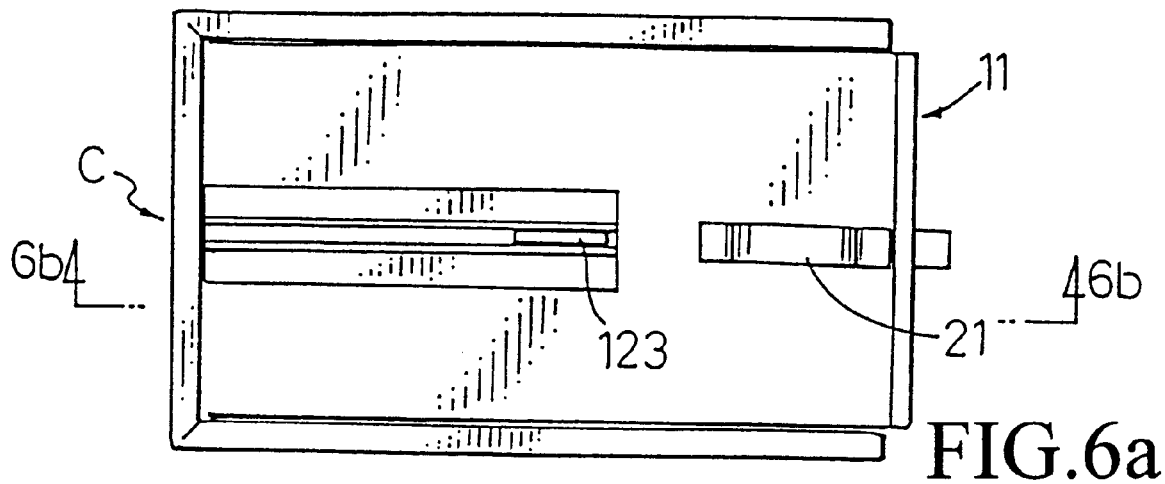
FIG. 6a is the top view of the jig shown in FIG. 3 with the object attached thereto.
Figure 6B:
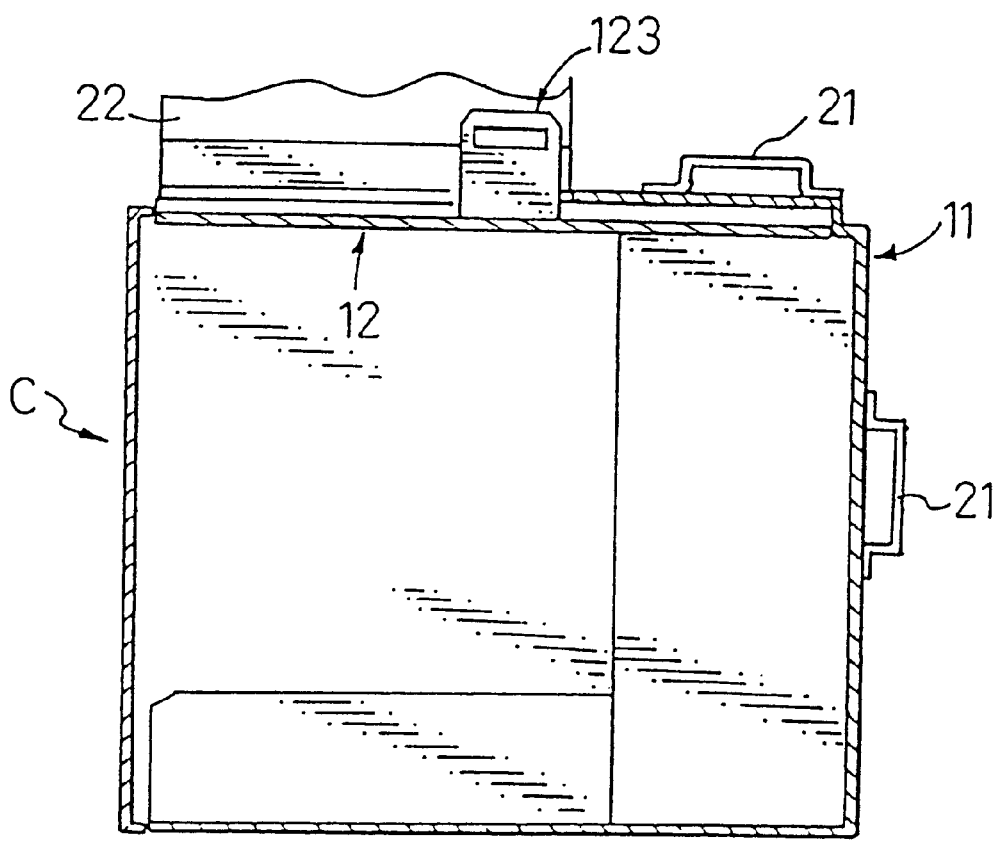
Figure 7A:
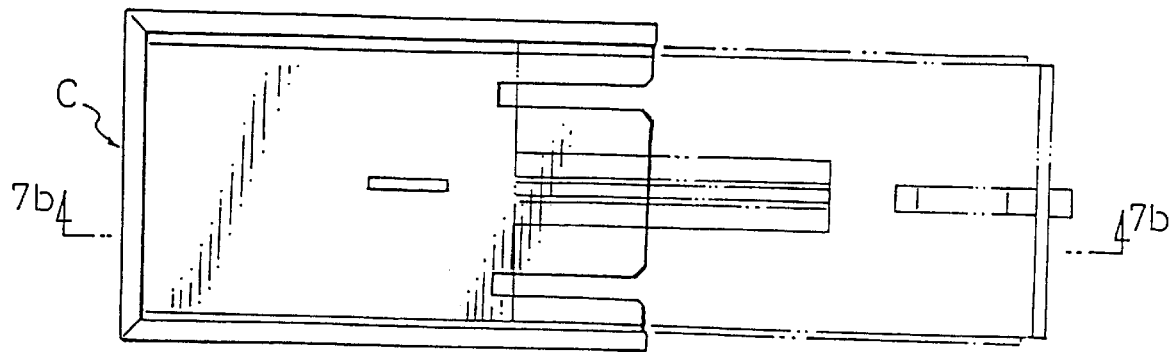
FIG. 7a is a top view of the jig with the object being pulled out.
Figure 7B:
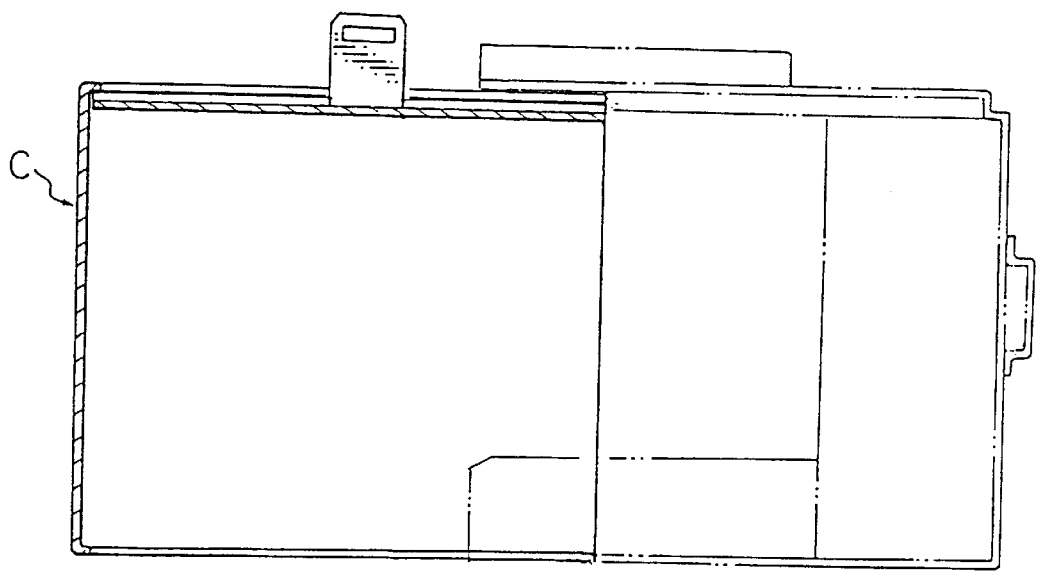

Referring to FIGS. 6a and 6b, after the object C is mounted onto the jig 10, a nearly sealed chamber is formed. The jig base 12, except for the hanger 123, is not exposed, while the jig cover 11 as well as the object C is exposed. In the preferred embodiment in accordance with the present invention, the top supporting plate 111 of the jig cover 11 is provided with a slot 110 in the central left area thereof (as shown in FIG. 3). Along the slot 10, two plastic sheets 22 are provided, which are used for covering the hanger 123. Since only the portion exposed would be covered with coating material, the jig base 12 would not be covered with coating material, the top plate 111 and side plate 112 of the jig cover 11 which are exposed would be covered with coating material. Since the jig cover 11, before baking, is pulled out and put in the recycling chamber 100 (where the jig cover 11 is cleansed by high-pressured air jet), most of the coating material covered thereon can be recycled.

It can be understood from the forgoing descriptions, the recycling method and the jig used therein can not only increase the recycled rate of the coating material, thus saving the cost of the paint, but also facilitate repeated use of the jig as there is no coating material accumulating on the surface of the jig. As compared with the conventional method in which the jig has to be discarded with less than twenty times of use, the cost reduction with regards to the coating material and the jig can be obtained in the present invention.

While this invention has been particularly shown and described with references to a preferred embodiment, it will be understood by those skilled in the art that various changes in form and details may be made therein without departing from the spirit and scope of the invention as defined by the appended claims.

What is claimed is:

1. A coating process for recycling coating material, comprising the steps of:

transporting a plurality of jig bases by mounting them on a conveyor in a subsequent order;

mounting a jig cover on each of said jig bases to form an assembled jig such that said jig cover substantially covers said base;

loading an object on said jig base of said assembled jig;

coating said object in a coating chamber while said jig together with said object being conveyed into said coating chamber;

conveying said jig together with said object out of said coating chamber;

unloading said jig cover from said jig base;

removing said coating material accumulated on said jig cover by subsequently delivering said jig cover to a coating material recycling chamber;

transporting said jig base and said object attached thereon without said jig cover previously unloaded from said jig base via a conveyor to a baking chamber to proceed with a baking process; and unloading said object from said jig base after baking process is completed.

2. The coating process of claim 1 further comprising a step of continuously transporting said jig bases to move forward after said object unloading step.

3. The coating process of claim 1 further comprising a step of cleansing said object before said object coating step.

* * * * *